Oct. 5, 1926.

C. G. GRIFFIN 1,601,826

GUARD FOR SICKLE BARS OF MOWING AND HARVESTING MACHINES

Filed Jan. 27, 1926

INVENTOR.
Clark G. Griffin.
BY
Adam E. Fisher.
ATTORNEYS.

Patented Oct. 5, 1926.

1,601,826

UNITED STATES PATENT OFFICE.

CLARK G. GRIFFIN, OF SPARKS, OKLAHOMA.

GUARD FOR SICKLE BARS OF MOWING AND HARVESTING MACHINES.

Application filed January 27, 1926. Serial No. 84,033.

My invention relates to improvements in guards for sickle bars of mowing and harvesting machines and the like.

It is an object of the invention to provide a guard adjustably connected with the guard bar, so the guards may be aligned to insure smoother operation of the sickle bar.

A further object of the invention is to provide a device of the above-mentioned character which is simple and durable in construction, reliable and efficient in use, and inexpensive to manufacture.

Other objects and advantages of the invention will be apparent during the course of the following description.

Figure 1:
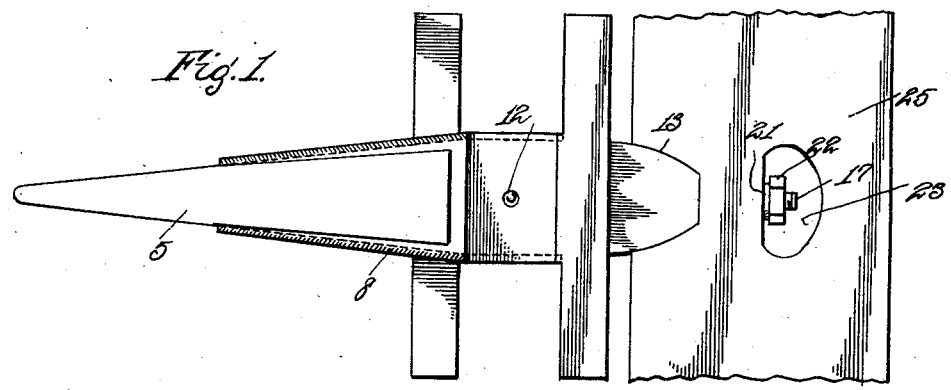
Figure 2:
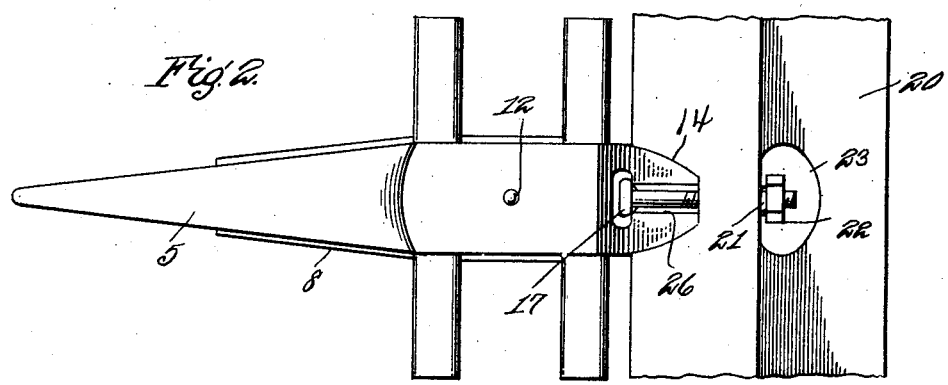
Figure 3:
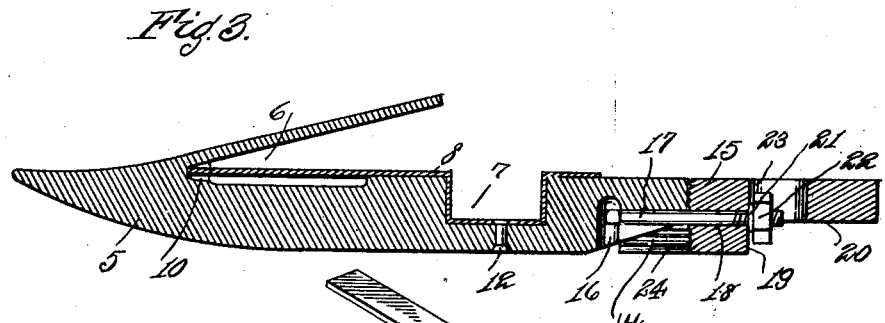
Figure 4:
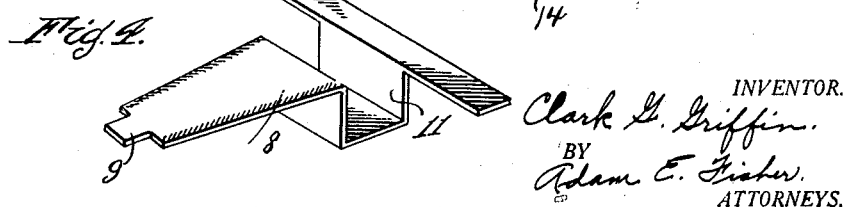

In the accompanying drawing, forming a part of this specification and in which like numerals are employed to designate like parts throughout the same, Fig. 1, is a top plan view of my improved guard, Fig. 2, is a bottom view of the same, Fig. 3, is a longitudinal sectional view of the guard, and, Fig. 4, is a perspective view of the ledger plate.

In the drawing, wherein for the purpose of illustration I have shown a preferred embodiment of my invention, the numeral 5 denotes the guard which is of conventional contour having the usual slot 6 to receive the cutters, not shown, and a transverse groove 7 in which the sickle bar, not shown, reciprocates back and forth. The wear on the guard caused by the movement of the cutters and sickle bar is reduced by the ledger plate 8, the forward portion of which extends into the slot 6 of the guard and has a tongue 9 which fits into a recess 10. The rear portion of the plate is depressed, as at 11, and fits in the groove 7, being secured therein by the rivet 12.

The rear end of the guard has its sides slightly beveled inwardly as at 13 and is adapted to fit the wedge-shaped recess 14 formed in the edge of the guard bar 15. A longitudinal T-shaped groove 16 is formed in the bottom of the guard adapted to receive the T-bolt 17 which extends through the opening 18 passing through the guard bar. The opening 18 extends from the base of the recess 14 to the shoulder 19 formed by recessing the guard bar 15 along its rear edge, as at 20. A washer 21 is fitted on the free end of the bolt 17 and a nut 22, threaded thereon, for tightening the bolt and clamping the guard in its adjusted position on the guard bar. An opening 23 extends through the guard bar beneath the end of the bolt, so that ready access may be had to the nut for tightening the same. As shown more clearly in Fig. 3, the sides and base of the recess 14 are provided with transverse corrugations 24, which firmly grip and hold the guard in its adjusted position upon tightening of the bolt 17.

In operation, it is well known that the guards are secured to the guard bar, at spaced intervals, and to insure smooth operation of the sickle bar the guards must be in true alignment. A guard of my construction will permit vertical adjustment of the guards, so that they may be accurately alined and firmly supported in their adjusted positions. Attention is also called to the fact that should any of the guards become broken, they may be easily removed, simply by loosening the bolt 17, and a new one substituted therefor.

It is to be understood that the form of my invention herewith shown and described is to be taken as a preferred example of the same and that certain changes in the shape, size and arrangement of the parts may be made without departing from the spirit of the invention or the scope of the subjoined claims.

Having thus described my invention, I claim:

1. A device of the character described comprising a guard bar having wedge shaped recesses at spaced intervals in its forward edge, a plurality of guard fingers having their inner ends shaped to fit said recesses, a T-shaped groove in the inner end of the fingers, and a T-bolt adapted to fit said groove and connect said fingers with said bar.

2. A device of the character described comprising a guard bar having wedge shaped recesses at spaced intervals in its forward edge, horizontal corrugations formed in the sides of said recesses, guard fingers having their inner ends shaped to fit said recesses, a T-shaped groove formed at the inner end of said fingers, and a T-bolt adapted to fit said groove and connect said fingers with said bar.

3. A device of the character described comprising a guard bar having wedge shaped recesses in its forward edge, guard fingers having their inner ends shaped to fit said recesses, an opening through said bar adjacent said recesses, a T-shaped groove formed in the inner end of said fingers, and a T-bolt adapted to fit in said groove, said bolt extending through an aperture leading from said recess to said opening, and a nut threaded on said bolt for clamping the bolt to connect said fingers with said bar.

In testimony whereof I affix my signature.

CLARK G. GRIFFIN.